Nov. 4, 1952     W. H. HARTLEY     2,616,236
COTTON STRIPPING COMB
Filed Aug. 7, 1950
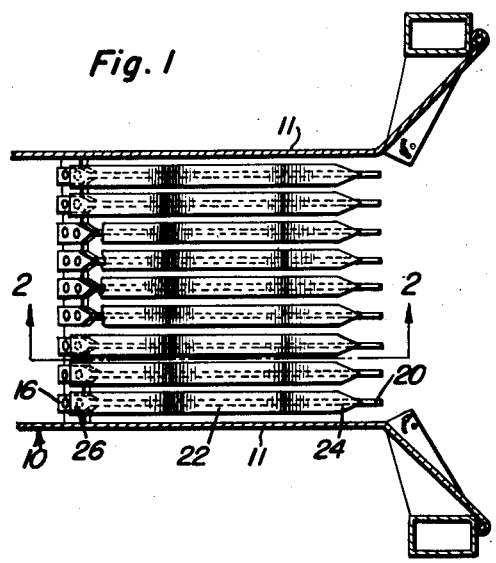
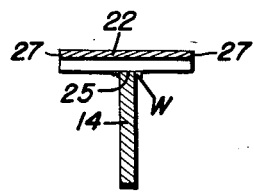
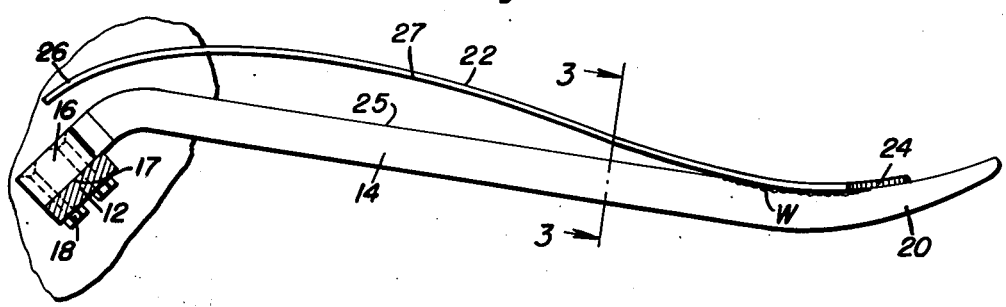
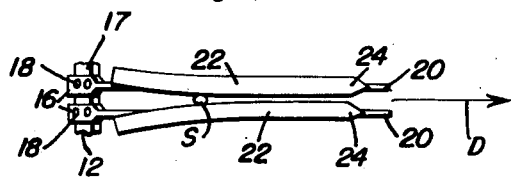
William H. Hartley
INVENTOR.

Patented Nov. 4, 1952

2,616,236

UNITED STATES PATENT OFFICE 2,616,236

COTTON STRIPPING COMB

William H. Hartley, Eldorado, Okla.

Application August 7, 1950, Serial No. 178,038

4 Claims. (Cl. 56—34)

This invention relates to new and useful improvements in cotton stripping devices and the primary object of the present invention is to provide a group of cotton stripping teeth so arranged and constructed as to reduce to a minimum the number of teeth required for effectively stripping cotton in a stripper, picker and/or harvester of cotton.

Another important object of the present invention is to provide a series of cotton stripping teeth for cotton stripping machines, harvesters and the like, that will accommodate larger stalks of cotton and which will strip various sizes of stalks without pulling the stalks out of the ground or wedging them into the teeth and thereby breaking stalks off and preventing efficient operation of a harvester.

A further object of the present invention is to provide a mechanical stripping tooth assembly composed of spring steel teeth that will spread sufficiently to accommodate stalks of various sizes without uprooting the stalks or clogging up the harvester.

A still further aim of the present invention is to provide a mechanical stripping tooth that is simple and practical in construction, strong and reliable in use, inexpensive to manufacture and install, and otherwise well adapted for the purposes for which the same is intended.

Other objects and advantages reside in the details of construction and operation as more fully hereinafter described and claimed, references being had to the accompanying drawings forming part hereof, wherein like numerals refer to like parts through, and in which:

Figure 1 is a general view of a cotton harvester boll-stripping scoop and showing the present invention mounted therein and with parts broken away and with parts shown in cross-section;

Figure 2 is an enlarged vertical sectional view taken substantially on the plane of section line 2—2 of Figure 1;

Figure 3 is an enlarged detail sectional view taken substantially on the plane of section line 3—3 of Figure 2; and Figure 4 is a fragmentary view of Figure 1 and showing a pair of adjacent teeth spreading to accommodate a stalk.

Referring now to the drawings in detail, wherein for the purpose of illustration, there is disclosed a preferred embodiment of the present invention, the numeral 10 represents a cotton harvester boll-stripping scoop generally whose side walls 11 support a horizontally disposed tooth supporting bar 12.

A plurality of spaced parallel arms 14 are associated with the bar 12 and include rear flattened and vertically inclined end portions 16 that are secured to the vertically inclined rear face 17 of the bar 12 by fasteners 18. The arms 14 are disposed edgewise and slope downwardly and forwardly. The forward end portions 20 of the arms 14 curve upwardly as shown best in Figure 2 of the drawings.

Each of the arms 14 supports an elongated substantially S-shaped resilient or spring metal tooth 22 having forward tapered or pointed ends 24 that are secured to the upper edges 25 of the arms 14, at the forward ends 20 of the arms 14, by welding or the like W. The rear downwardly curved ends 26 of the teeth 22 are disposed directly above the flattened end portions 16 of the arms 14.

Only the forward ends 24 of the teeth 22 are attached to the arms 14 and all but the forward ends 24 of the teeth 22 are spaced from the upper edges 25 of the arms 14. The teeth 22 are considerably wider than the thickness of the arms 14 to reduce to a minimum the number of teeth 22 required and to permit the side edges 27 of adjacent teeth 22 to ride against a stalk S without the stalk engaging the arms 14.

In practical use of the present invention as the scoop 10 is moved forwardly in the direction of arrow D in Figure 4, the stalk S will ride between the forward ends 24 of an adjacent pair of teeth 22, and as the rear ends 26 of the teeth 22 approach the stalk they will be spread apart, as shown in Figure 4, so that the cotton will be effectively stripped from the stalk, regardless as to the size of the stalk.

In view of the foregoing description taken in conjunction with the accompanying drawings, it is believed that a clear understanding of the device will be quite apparent to those skilled in this art. A more detailed description is accordingly deemed unnecessary.

It is to be understood, however, that even though there is herein shown and described a preferred embodiment of the invention, the same is susceptible to certain changes fully comprehended by the spirit of the invention as herein described and the scope of the appended claims.

Having described the invention, what is claimed as new is:

1. For use with a cotton harvester of the type having a toothed cotton boll-stripping scoop including a transverse bar and a plurality of parallel arms terminally attached to said bar, the improvement of which comprises a resilient tooth overlying each arm, said teeth having forward ends attached to said arms and rear longitudinally concavo-convexed ends overlying said bar, said teeth including side edges projecting laterally beyond the sides of the arms to locate the adjacent teeth closer together than adjacent arms.

2. The combination of claim 1 wherein said teeth are attached solely to said arms at their forward ends, the rear ends of said teeth being spaced above said arms.

3. In a cotton boll-stripping scoop, a substantially horizontal tooth supporting bar, a plurality of spaced parallel arms having inner ends attached to said bar and upwardly curved outer ends, and an elongated resilient tooth overlying each arm, said teeth having forward pointed ends permanently secured to the outer ends of said arms and downwardly curved rear ends spaced above the inner ends of said arms, said teeth each having side edges projecting beyond the sides of their supporting arms with the adjacent side edges of adjacent teeth being disposed closer together than adjacent arms.

4. In a cotton boll-stripping scoop, a substantially horizontal tooth supporting bar, a plurality of spaced parallel elongated arms having rear end portions secured to said bar, said arms being disposed edgewise and including upper edges and upwardly curved forward end portions, and a substantially S-shaped spring tooth overlying each of said arms, said teeth having forward ends attached to the forward end portions of said arms and rear ends spaced above the rear end portions of said arms, said teeth being considerably wider than the thickness of said arms to position adjacent teeth closer together than adjacent arms.

WILLIAM H. HARTLEY.

REFERENCES CITED

The following references are of record in the file of this patent:

UNITED STATES PATENTS

| Number | Name | Date |
| --- | --- | --- |
| 480,131 | Perry | Aug. 2, 1892 |
| 1,256,176 | Simpson | Feb. 12, 1918 |
| 2,445,162 | Wallace | July 13, 1948 |
| 2,526,535 | Brown | Oct. 17, 1950 |